US012597572B2

(12) United States Patent
Yu et al.

(10) Patent No.: US 12,597,572 B2
(45) Date of Patent: Apr. 7, 2026

(54) LAYER-STRUCTURED, OPEN-DESIGN KEYBOARD

(71) Applicant: SHENZHEN MLOONG DIGITAL CO., LTD., Shenzhen (CN)

(72) Inventors: Mengyao Yu, Shenzhen (CN); Zhichao Wang, Shenzhen (CN)

(73) Assignee: SHENZHEN MLOONG DIGITAL CO., LTD., Shenzhen (CN)

( * ) Notice: Subject to any disclaimer, the term of this patent is extended or adjusted under 35 U.S.C. 154(b) by 367 days.

(21) Appl. No.: 18/349,942

(22) Filed: Jul. 10, 2023

(65) Prior Publication Data

US 2024/0312739 A1 Sep. 19, 2024

(30) Foreign Application Priority Data

Mar. 16, 2023 (CN) ......................... 202310280290.9

(51) Int. Cl.
*H01H 13/704* (2006.01)

(52) U.S. Cl.
CPC ..... *H01H 13/704* (2013.01); *H01H 2207/014* (2013.01); *H01H 2223/024* (2013.01); *H01H 2239/058* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

2018/0218859 A1* 8/2018 Ligtenberg ............ G06F 3/0414
2019/0091946 A1* 3/2019 Lancaster-Larocque .................... B29C 70/541
2023/0403008 A1* 12/2023 Huang .................. G06F 3/0202
2024/0126378 A1* 4/2024 Lu .......................... H01H 13/83

* cited by examiner

*Primary Examiner* — Ahmed M Saeed
(74) *Attorney, Agent, or Firm* — Leong C. Lei

(57) ABSTRACT

A layer-structured, open-design keyboard includes a main body and a tray attached to the main body from below. The main body has key mechanisms and keycaps mounted on tops of the key mechanisms. The main body includes an upper-layer plate, a middle-layer plate, a circuit board, and a lower-layer plate arranged from a top to a bottom of the main body successively in a spaced manner, so as to define three clearance spaces that communicate the interior of the main body with the exterior.

6 Claims, 11 Drawing Sheets

LAYER-STRUCTURED, OPEN-DESIGN KEYBOARD

BACKGROUND OF THE INVENTION

1. Technical Field

The present invention related to keyboards, and more particularly to a layer-structured, open-design keyboard.

2. Description of Related Art

With development of science and technologies, computer penetration has shown to be increasing, and computers are considered a necessity for both work and living by people. Since many people spend hours every day in computer mediated activities for work or entertainment purposes, use of keyboards, as devices for inputting instructions and data to computers, is unsurprisingly their daily practice.

Typically, a battery-powered keyboard may have a battery compartment located at the bottom or back side of its circuit board. This unavoidably increases the height or width of the keyboard, leading to increased overall bulkiness and degraded esthetics of the keyboard. As a solution, China Utility Model Application No. 202122494375.6 (Publication No. CN216623193 U) discloses a split-type keyboard that features a detachable battery compartment. Therein, the battery compartment is split from the main body of the keyboard, making them two separate products. The battery compartment is detachably connected to the main body of the keyboard and thereby powers the main body of the keyboard through POGO PIN connectors. Such a battery compartment can be detached from and moved with respective to the main body of the keyboard, and allows the main body of the keyboard to be designed with a reduced volume. The known keyboard has its main body composed of a lower cover and an upper cover, which are usually made of acrylonitrile butadiene styrene (ABS) in industrial practice. Production of ABS components requires high modeling costs, and in turn adds burden to the overall manufacturing costs of the keyboard. Furthermore, a peripherally closed chamber defined between the lower and upper covers can prevent dissipation of the heat generated during use of the keyboard and degrade user experience by amplifying impact echo when keys are hit.

Hence, there is a need for novel technical schemes that at least partially address the shortcomings of the prior art.

SUMMARY OF THE INVENTION

In view of the shortcomings of the prior art, the primary objective of the present invention is to provide a layer-structured, open-design keyboard, which comprises an upper-layer plate, a middle-layer plate, a circuit board, and a lower-layer plate arranged from the top to the bottom of the main body successively in a spaced manner, so as to define three clearance spaces that communicate the interior of the main body and the exterior, thereby improving heat dissipation from the main body, preventing generation of impact echo during operation of the keyboard, and in turn improving overall user experience. The plates are easy and inexpensive to manufacture without the need of modeling. The design of the periphery of each of the plates may be adapted to practical needs, thereby accomplishing open design of the keyboard. Moreover, by placing the IO board in the tray, separation between the IO board and the main body is accomplished, which allows the main body to be made more compact.

In order to achieve the foregoing objective, the present invention adopts the following technical schemes:

a layer-structured, open-design keyboard, comprising a main body and a tray attached to the main body from below, the main body having key mechanisms and keycaps mounted on tops of the key mechanisms;

the main body including an upper-layer plate, a middle-layer plate, a circuit board, and a lower-layer plate arranged from a top to a bottom of the main body successively in a spaced manner, so as to define three clearance spaces that communicate the interior of the main body with the exterior, thereby improving heat dissipation from the main body, preventing generation of impact echo during operation of the keyboard, and in turn improving overall user experience, in which the plates are easy and inexpensive to manufacture without the need of modeling, and the design of the periphery of each of the plates may be adapted to practical needs, thereby accomplishing open design of the keyboard;

the key mechanisms being installed on the middle-layer plate, the key mechanisms having bottoms thereof inserted into the circuit board, and the keycaps being exposed at a top of the upper-layer plate; and the tray defining an accommodating chamber that receives therein an IO board electrically connected to the circuit board, in which by placing the IO board in the tray, separation between the IO board and the main body is accomplished, which allows the main body to be made more compact.

The present invention thus has evident advantages and benefits over the prior art. Specifically, with the foregoing technical schemes:

the upper-layer plate, the middle-layer plate, the circuit board, and the lower-layer plate arranged from the top to the bottom of the main body successively in the spaced manner can define three clearance spaces that communicate the interior of the main body and the exterior, thereby improving heat dissipation from the main body, preventing generation of impact echo during operation of the keyboard, and in turn improving overall user experience, in which the plates are easy and inexpensive to manufacture without the need of modeling, and the design of the periphery of each of the plates may be adapted to practical needs, thereby accomplishing open design of the keyboard. Moreover, by placing the IO board in the tray, separation between the IO board and the main body is accomplished, which allows the main body to be made more compact.

DETAILED DESCRIPTION OF THE INVENTION

Figure 1:
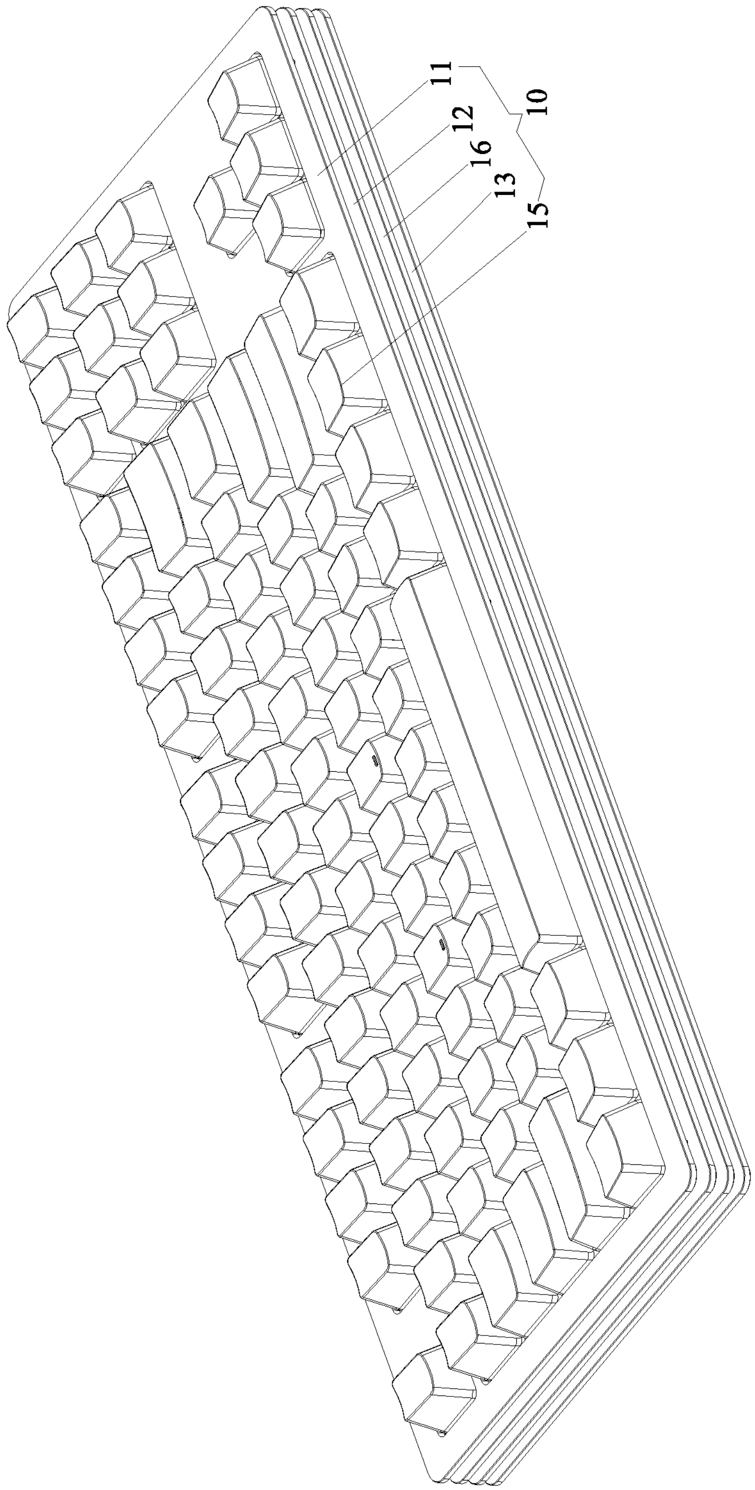
FIG. 1 is a perspective view of a first preferred embodiment of the present invention realized as an 87-key wireless keyboard.
Figure 2:
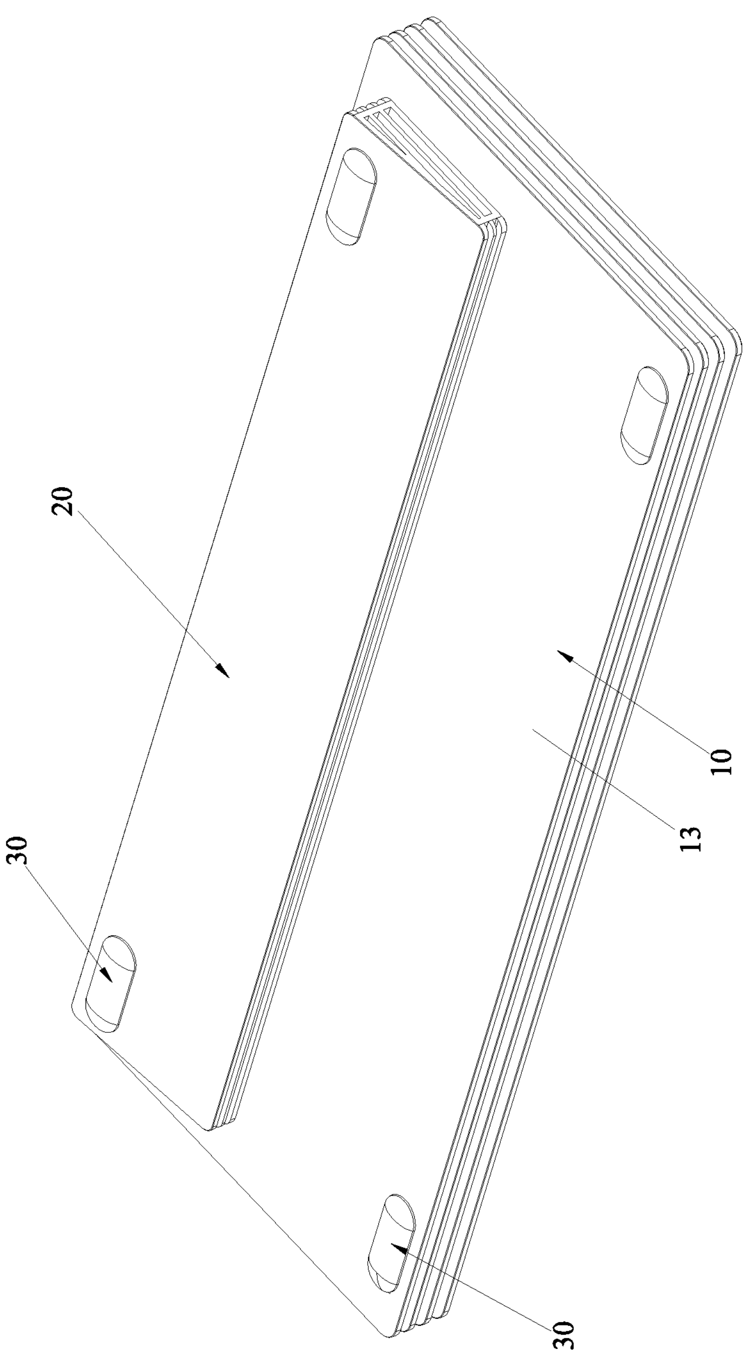
FIG. 2 is another perspective view of the keyboard of FIG. 1, taken from a different viewpoint.
Figure 3:
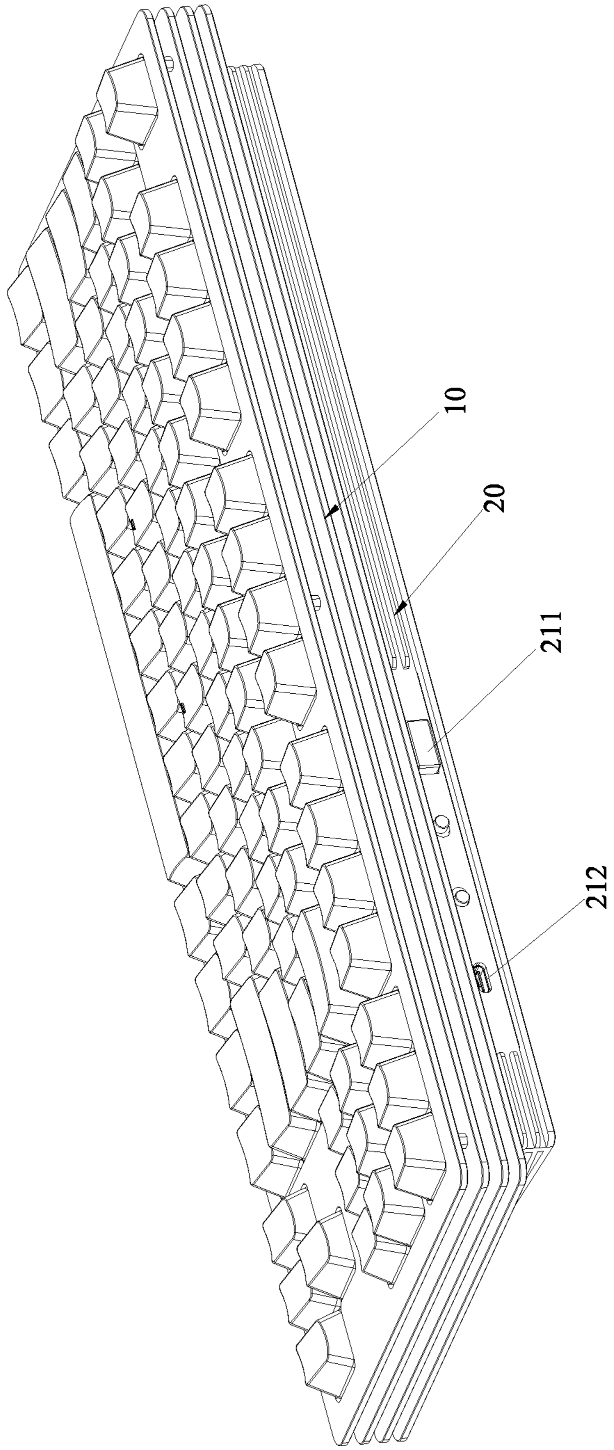
FIG. 3 is yet another perspective view of the keyboard of FIG. 1, taken from a different viewpoint.
Figure 4:
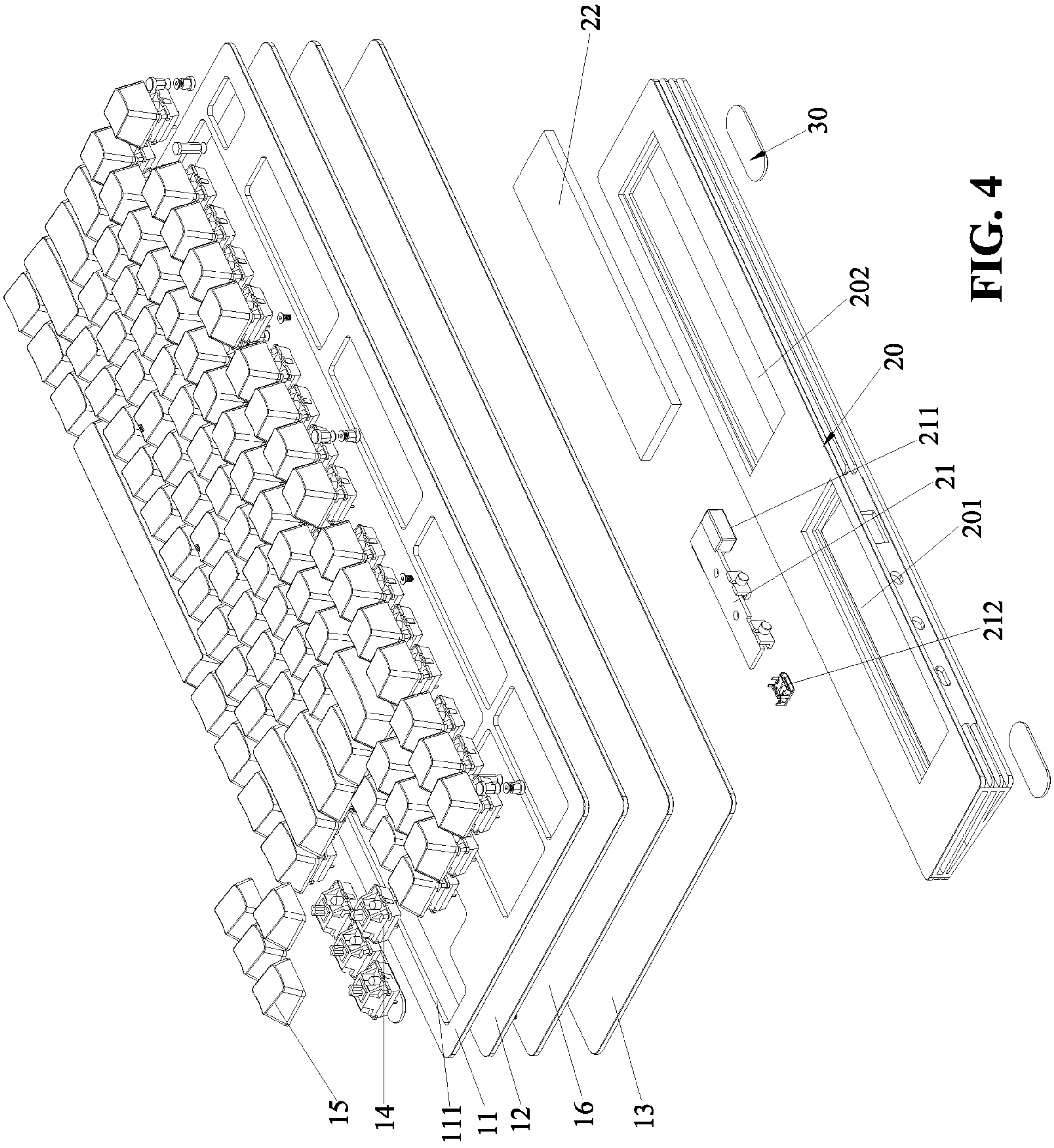
FIG. 4 is an exploded view of the keyboard of FIG. 1.

It is first to be noted that spatial descriptions, such as "up," "down," "left," and "right," are indicated with respect to the orientation shown in the figures unless otherwise specified. It should be understood that the spatial descriptions used herein are only for purposes of simple illustration, and not intended to indicate or imply that the objects described need to be in any particular direction or need to be constructed or operated in any particular direction. In brief, these spatial descriptions should not be construed as limitations to the present invention.

FIG. 1 through FIG. 11 depict some preferred embodiments of the present invention. Each of the embodiments is structurally constructed from a main body 10 and a tray 20 at the bottom of the main body 10.

As shown in FIG. 1 through FIG. 4, the main body 10 comprises an upper-layer plate 11, a middle-layer plate 12, a circuit board 40, and a lower-layer plate 13 arranged from the top to the bottom of the main body 10 successively in a spaced manner, so as to define three clearance spaces 50. The clearance spaces 50 communicate the interior of the main body 10 with the exterior, thereby improving heat dissipation from the main body, preventing generation of impact echo during operation of the keyboard, and in turn improving overall user experience. The plates are easy and inexpensive to manufacture without the need of modeling. The design of the periphery of each of the plates may be adapted to practical needs, thereby accomplishing open design of the keyboard. On the middle-layer plate 12, key mechanisms 14 are mounted. On each of the key mechanisms 14, a keycap 15 is mounted. The keycaps 15 are exposed at the top of the upper-layer plate 11. The key mechanism 14 has its bottom inserted into the circuit board 40. The tray 20 defines an accommodating chamber 201 for receiving therein an IO board 21 that is electrically connected to the circuit board 40. By placing the IO board 21 in the tray 20, separation between the IO board 21 and the main body 10 is accomplished, so that the main body 10 can be made more compact. Therein, the key mechanisms 14 and the keycaps 15 are well known in the art and will not be detailed herein.

In particular, the upper-layer plate 11 is fixed to the middle-layer plate 12 by means of first screws 112, and the lower-layer plate 13 is fixed to the middle-layer plate 12 by means of second screws 131. The main body 10 further comprises a frame plate 16. The frame plate 16 frames the circuit board 40 peripherally. The frame plate 16 is fixed to the middle-layer plate 12 or the lower-layer plate 13 by means of third screws 161. The upper-layer plate 12, the middle-layer plate 13, the frame plate 16, and the lower-layer plate 14 are arranged from the top to the bottom of the main body successively in a spaced manner. The frame plate 16, to a certain extent, keeps the circuit board 40 from being seen from outside, so as to improve the esthetic appearance of the main body 10.

In the present embodiment, the frame plate 16 is fixed to the lower-layer plate 13 by means of the third screws 161. Further, the upper-layer plate 11 is provided with cut-away vias 111, and the keycaps 15 are located in areas enclosed by the cut-away vias 111. The key mechanisms 14 atop stick out the cut-away vias 111. The middle-layer plate 12 is provided with mount holes 121 complementary to the key mechanisms 14 so that the key mechanisms 14 can be fit into the mount holes 121. The circuit board 40 is provided with sockets for the key mechanisms 14 to plug in.

The upper-layer plate 11, the middle-layer plate 12, the frame plate 16, and the lower-layer plate 13 are each a plank made of, for example, plastic, wood, iron, aluminum, carbon fibers, composite fibers, or any combination thereof, without limitation. Such a plank is versatile while being easy and inexpensive to manufacture without the need of modeling.

The tray 20 is attached to the back end of the bottom of the lower-layer plate 13. The tray 20 defines the upward-open accommodating chamber 201 for receiving the IO board 21. The IO board 21 is electrically connected to the circuit board. By placing the IO board 21 in the tray 20, separation between the IO board 21 and the main body 10 is accomplished, so the main body 10 can be made more compact.

Specifically, the tray 20 is fixed to the bottom of the lower-layer plate 13 by means of fourth screws. Preferably, anti-slip pads 30 are provided at both the back end of the bottom of the tray 20 and the front end of the bottom of the lower-layer plate 13 to add friction to the main body 10 and the tray 20 at bottom when the disclosed keyboard is placed on, for example, a desktop, so as to facilitate use of the keyboard.

In the present embodiment, the tray 20 is a plank made of, for example, plastic, wood, iron, aluminum, carbon fibers, composite fibers, or any combination thereof, without limitation. Such a plank is versatile while being easy and to inexpensive to manufacture without the need of modeling. The tray 20 defines a battery compartment 202 open upward. The battery compartment 202 is located beside the accommodating chamber 201, and a cable duct is provided between the battery compartment 202 and the accommodating chamber 201. The battery compartment 202 receives a battery 22 therein. The battery 22 is electrically connected to the IO board 21, so as to power the circuit board. With the provision of the battery 22, the keyboard may be used as a wireless keyboard, adding extras convenience to users.

Figure 5:
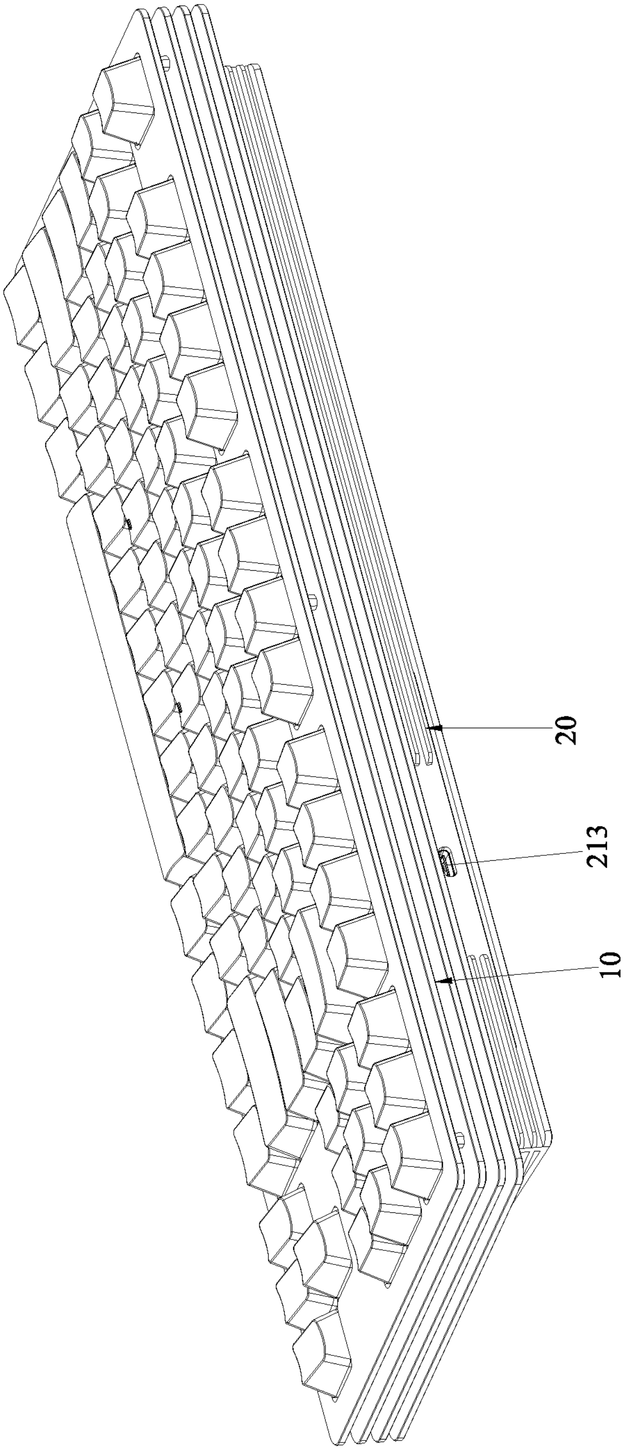
FIG. 5 is a perspective view of a second preferred embodiment of the present invention realized as an 87-key wired keyboard.
Figure 6:
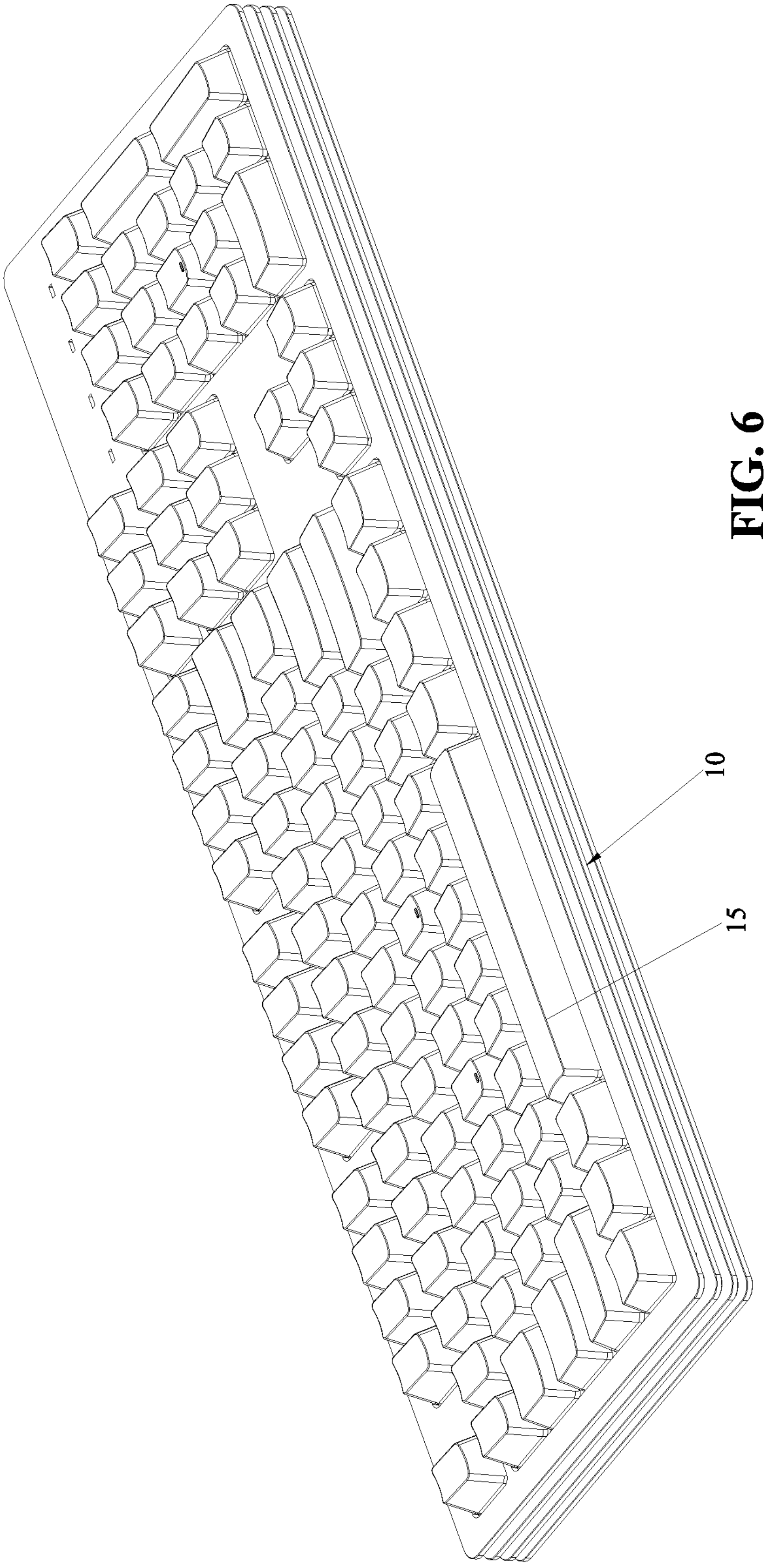
FIG. 6 is a perspective view of a third preferred embodiment of the present invention realized as a 104-key wireless keyboard.

As shown in FIGS. 1-4 and FIG. 6, when the tray 20 contains the battery 22, the open-design keyboard is a wireless keyboard, which has its IO board 21 provided with a control switch 211 and a charging port 212. With connection of a cable to the charging port, the wireless keyboard can be used as a wired keyboard. As shown in FIG. 5, when the tray 20 does not contain the battery 22, the open-design keyboard is a wired keyboard, which has its IO board 21 only provided with a power socket 213 to which a power cord is connected to power the open-design keyboard.

Figure 7:
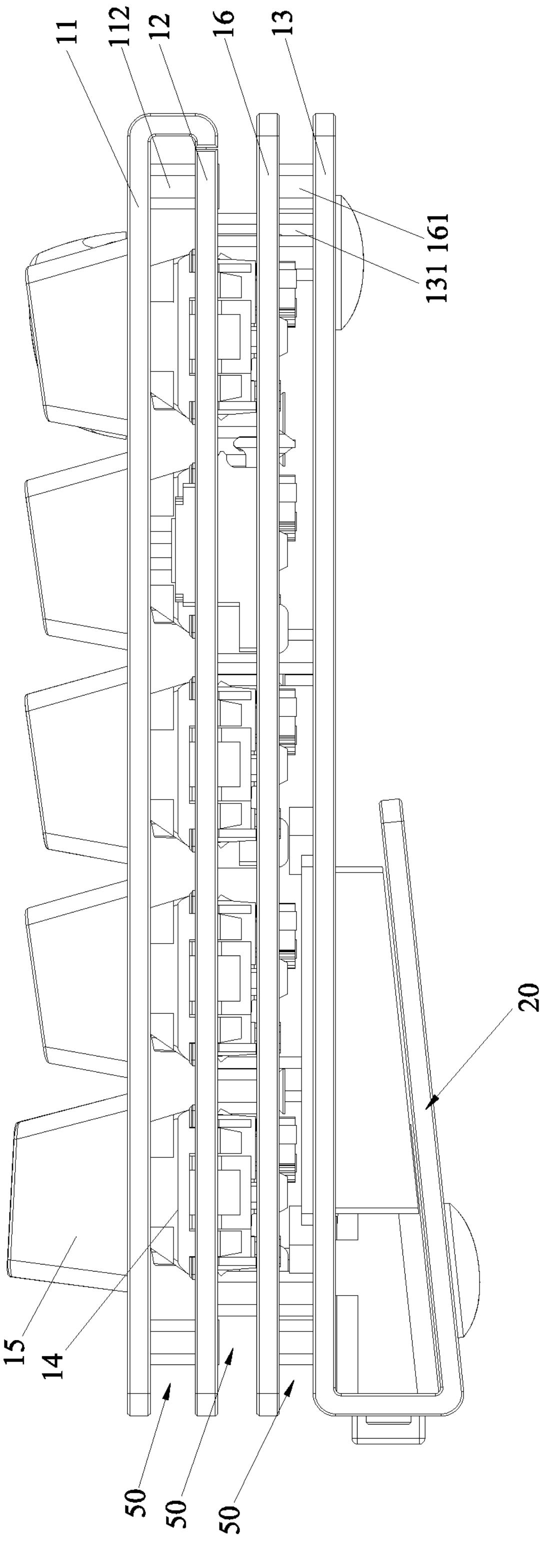
FIG. 7 is a side view of a fourth preferred embodiment of the present invention.
Figure 8:
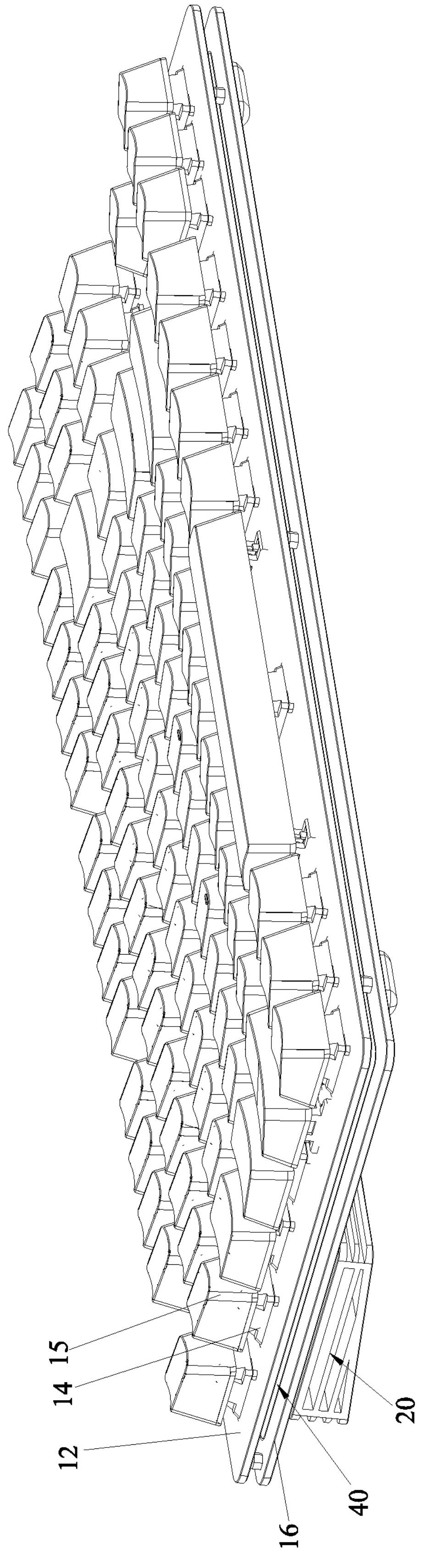
FIG. 8 is a perspective view of a fifth preferred embodiment of the present invention realized as an 87-key wireless keyboard.
Figure 9:
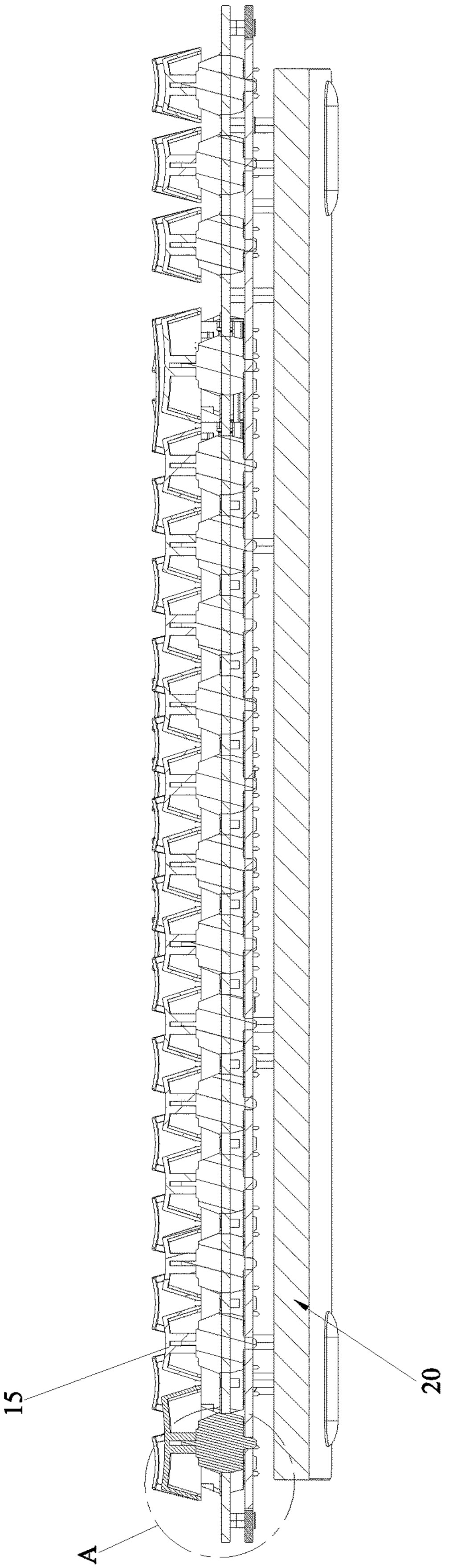
FIG. 9 is a cross-sectional view of the keyboard of FIG. 8.
Figure 10:
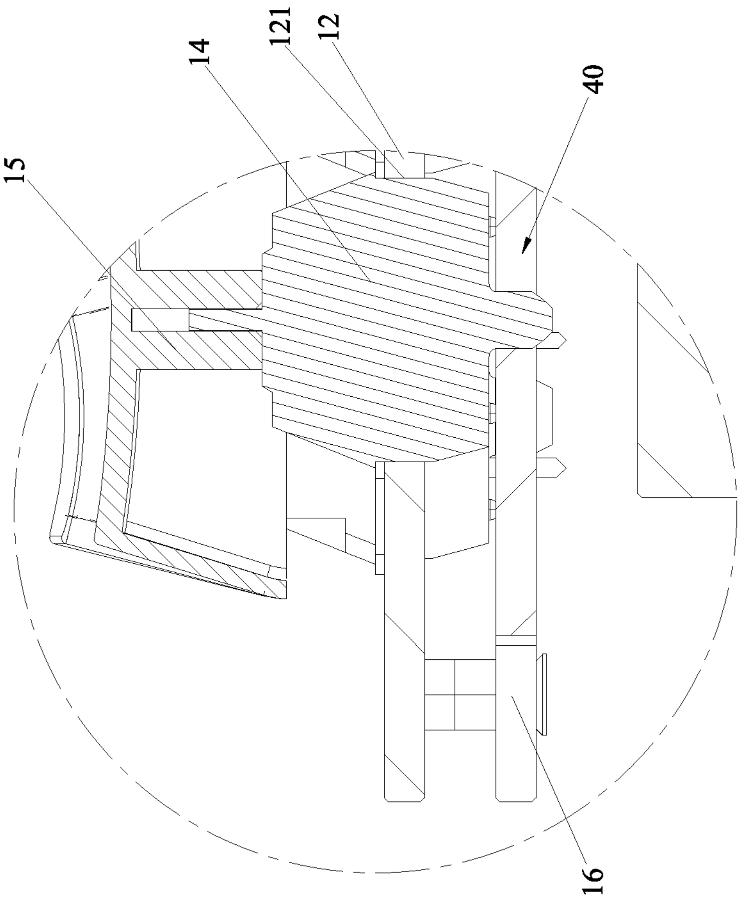
FIG. 10 is an enlarged view of circle A of FIG. 9.
Figure 11:
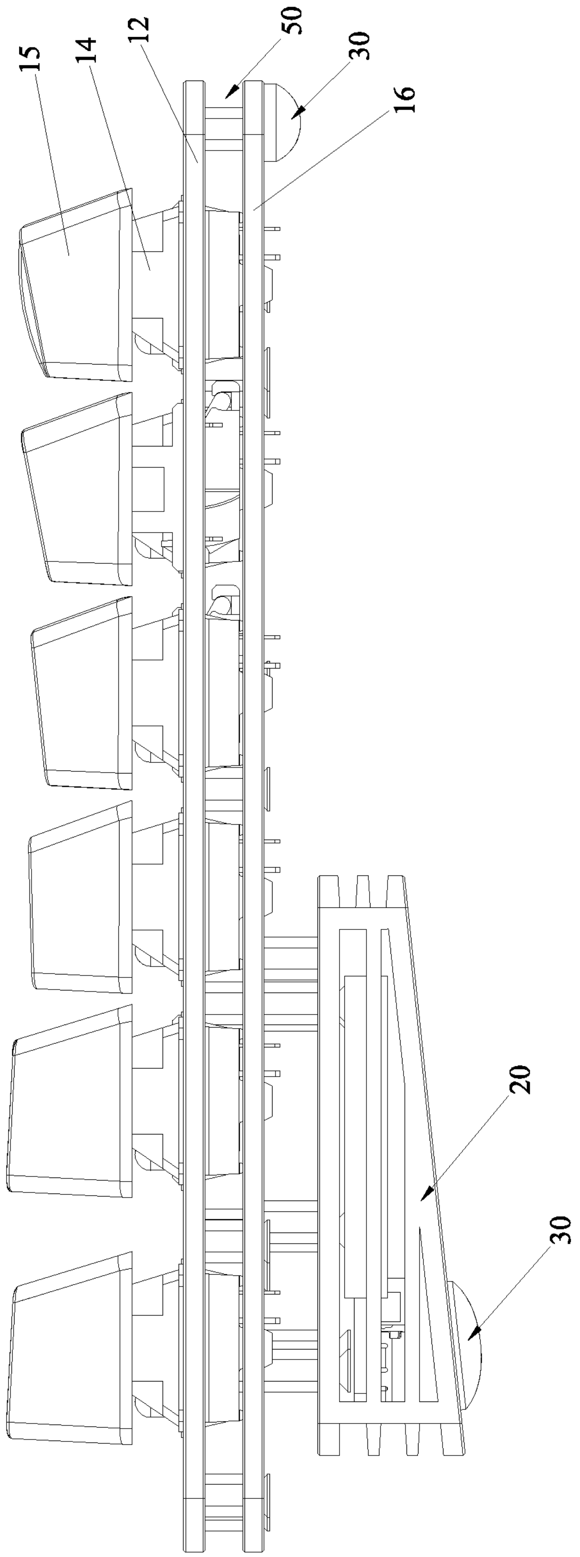
FIG. 11 is a side view of the keyboard of FIG. 8.

In some embodiments, as shown in FIG. 7, the front end of the upper-layer plate 11 bends toward the middle-layer plate 12, so as to close the front end of the clearance space 50. The tray 20 is formed by the bent back end of the lower-layer plate 13. These plates can be designed flexibly and this ability accomplishes open design of the keyboard.

In some embodiments, as shown in FIG. 8 through FIG. 11, the main body 10 may be devoid of the upper-layer plate 11 and the lower-layer plate 13. In such case, the circuit board 40 is fixed to the bottom of the middle-layer plate 12 by means of first connecters. The tray 20 is fixed to the bottom of the middle-layer plate 12 by means of second connectors. The frame plate 16 is fixed to the bottom of the middle-layer plate 12 by means of third connectors. The periphery of the frame plate 16 does not go beyond the periphery of the middle-layer plate 12. Preferably, the first connectors, the second connectors, and the third connectors are all screws, or they are alternatively realized as snap-in connection, without limitation. The periphery of the frame plate 16 is positioned flush with the periphery of the middle-layer plate 12, so as to improve the esthetic appearance of the main body.

Both the back end of the bottom of the tray 20 and the front end of the bottom of the frame plate 16 are provided with anti-slip pads 30. Provision of the anti-slip pads 30 adds friction to the main body 10 and the tray 20 at bottom when the disclosed keyboard is placed on, for example, a desktop, so as to facilitate use of the keyboard.

What is claimed is:

1. A layer-structured, open-design keyboard, comprising a main body and a tray attached to the main body from below, the main body having key mechanisms and keycaps mounted on tops of the key mechanisms;

the main body including an upper-layer plate, a middle-layer plate, a circuit board, and a lower-layer plate arranged from a top to a bottom of the main body successively in a spaced manner, so as to define three clearance spaces that communicate an interior of the main body with an exterior of the main body;

the key mechanisms being installed on the middle-layer plate, the key mechanisms having bottoms thereof inserted into the circuit board, and the keycaps being exposed at a top of the upper-layer plate; and the tray defining an accommodating chamber that receives therein an IO board electrically connected to the circuit board;

wherein the upper-layer plate is fixed to the middle-layer plate by means of first screws, and the lower-layer plate is fixed to the middle-layer plate by means of second screws; and wherein the main body further comprises a frame plate that frames the circuit board peripherally and is fixed to the middle-layer plate or the lower-layer plate by means of third screws, in which the upper-layer plate, the middle-layer plate, the frame plate, and the lower-layer plate are arranged from the top to the bottom of the main body successively in the spaced manner.

2. The layer-structured, open-design keyboard according to claim 1, wherein the main body further comprises a frame plate that frames the circuit board peripherally and is fixed to the middle-layer plate or the lower-layer plate by means of third screws, in which the upper-layer plate, the middle-layer plate, the frame plate, and the lower-layer plate are arranged from the top to the bottom of the main body successively in the spaced manner.

3. The layer-structured, open-design keyboard according to claim 1, wherein the upper-layer plate is formed with cut-away vias, and the keycaps are located in areas enclosed by the cut-away vias, in which the tops of the key mechanisms stick out the cut-away vias.

4. The layer-structured, open-design keyboard according to claim 1, wherein the middle-layer plate is provided with mount holes complementary to the key mechanisms, and the key mechanisms are fit into the mount holes.

5. The layer-structured, open-design keyboard according to claim 1, wherein the tray has a battery compartment that receives therein a battery, in which the battery is electrically connected to the IO board so as to power the circuit board.

6. The layer-structured, open-design keyboard according to claim 1, wherein both a back end of a bottom of the tray and a front end of a bottom of the lower-layer plate are provided with anti-slip pads.

* * * * *